United States Patent
Zhang et al.

(10) Patent No.: US 12,009,920 B2
(45) Date of Patent: Jun. 11, 2024

(54) POLAR CODE RETRANSMISSION METHOD AND APPARATUS

(71) Applicant: Huawei Technologies Co., Ltd., Shenzhen (CN)

(72) Inventors: Zhaoyang Zhang, Hangzhou (CN); Yunmei Zhang, Hangzhou (CN); Deng Zheng, Hangzhou (CN); Kangjian Qin, Hangzhou (CN); Tianhang Yu, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 344 days.

(21) Appl. No.: 17/562,743

(22) Filed: Dec. 27, 2021

(65) Prior Publication Data

US 2022/0123862 A1     Apr. 21, 2022

Related U.S. Application Data

(63) Continuation of application No. PCT/CN2020/093771, filed on Jun. 1, 2020.

(30) Foreign Application Priority Data

Jun. 28, 2019 (CN) .......................... 201910580513.7

(51) Int. Cl.
 *H03M 13/29* (2006.01)
 *H03M 13/00* (2006.01)
 (Continued)

(52) U.S. Cl.
 CPC .......... *H04L 1/0057* (2013.01); *H04L 1/1812* (2013.01)

(58) Field of Classification Search
 None
 See application file for complete search history.

(56) References Cited

U.S. PATENT DOCUMENTS

| 10,312,948 B1 | 6/2019 | Arikan |
| 2014/0153628 A1* | 6/2014 | Vojcic ............... H03M 13/6325 375/227 |

(Continued)

FOREIGN PATENT DOCUMENTS

| CN | 105227189 A | 1/2016 |
| CN | 107612561 A | 1/2018 |

(Continued)

OTHER PUBLICATIONS

"HARQ scheme for polar codes," 3GPP TSG RAN WG1 Meeting #87, Reno, USA, R1-1613301, Total 41 pages, 3rd Generation Partnership Project, Valbonne, France (Nov. 14-18, 2016).

(Continued)

*Primary Examiner* — Sai Aung
(74) *Attorney, Agent, or Firm* — Leydig, Voit & Mayer, Ltd.

(57) ABSTRACT

This application discloses a polar code retransmission method and apparatus, to achieve an encoding gain. The method includes: when decoding of the first code word fails, performing polar code encoding on K first to-be-encoded bits and K' second to-be-encoded bits based on a second information bit position set to obtain a second code word, where elements in the second information bit position set are used to indicate positions of the to-be-encoded bits, and an element that is in the second information bit position set and that is used to indicate a position of a first to-be-encoded bit is a sum of N and an element that is in the first information bit position set and that is used to indicate the position of the first to-be-encoded bit; and sending a subcode in the second code word other than the first code word to the decoding device.

20 Claims, 8 Drawing Sheets

(51) Int. Cl.
*H03M 13/11* (2006.01)
*H04L 1/00* (2006.01)
*H04L 1/1812* (2023.01)

(56) References Cited

U.S. PATENT DOCUMENTS

| | | | | |
|---|---|---|---|---|
| 2016/0013887 | A1* | 1/2016 | Shen | H04L 1/0057 375/295 |
| 2017/0012744 | A1* | 1/2017 | Shen | H04L 43/16 |
| 2021/0099213 | A1* | 4/2021 | Chen | H04L 1/0009 |

FOREIGN PATENT DOCUMENTS

| | | |
|---|---|---|
| CN | 108092742 A | 5/2018 |
| CN | 108886421 A | 11/2018 |
| CN | 108886438 A | 11/2018 |
| CN | 109639395 A | 4/2019 |
| CN | 109863705 A | 6/2019 |
| EP | 3335321 B1 | 10/2021 |
| WO | 2018045849 A1 | 3/2018 |
| WO | 2018126906 A1 | 7/2018 |
| WO | 2018201481 A1 | 11/2018 |
| WO | 2019095190 A1 | 5/2019 |

OTHER PUBLICATIONS

ZTE, ZTE Microelectronics, "HARQ Performance of Rate-compatible Polar codes," 3GPP TSG RAN WG1 #86bis, Reno, US, R1-1611110, total 6 pages, 3rd Generation Partnership Project, Valbonne, France (Nov. 14-18, 2016).

Huawei, HiSilicon, "HARQ for Polar codes," 3GPP TSG RAN WG1 Meeting AH 1801, Vancouver, Canada, R1-1800106, total 3 pages, 3rd Generation Partnership Project, Valbonne, France (Jan. 22-26, 2018).

ZTE, ZTE Microelectronics, "HARQ Performance of Rate-compatible Polar codes," 3GPP TSG RAN WG1 #87, Reno, US, R1-1613267, total 8 pages, 3rd Generation Partnership Project, Valbonne, France (Nov. 14-18, 2016).

* cited by examiner

☒ CRC check bit
■ Information bit
☐ Frozen bit
▨ New information bit (new bit)

☒ CRC check bit
■ Information bit
☐ Frozen bit
▨ New information bit (new bit)

Copy

POLAR CODE RETRANSMISSION METHOD AND APPARATUS

CROSS-REFERENCE TO RELATED APPLICATIONS

This application is a continuation of International Patent Application No. PCT/CN2020/093771 filed on Jun. 1, 2020, which claims priority to Chinese Patent Application No. 201910580513.7, filed Jun. 28, 2019. The disclosures of the aforementioned applications are hereby incorporated by reference in their entireties.

TECHNICAL FIELD

Embodiments of this application relate to the field of communication technologies, and in particular, to a polar code retransmission method and apparatus.

BACKGROUND

As the most basic radio access technology, channel encoding plays an important role in ensuring reliable data transmission. In an existing wireless communication system, channel encoding is usually performed by using a turbo code, a low density parity check (LDPC) code, and a polar code. The polar code proposed by Professor Arikan is a good code that is theoretically proved to be capable of reaching a Shannon capacity and has relatively low encoding and decoding complexity, and therefore is increasingly widely applied.

Generally, for a delay-insensitive time-varying channel, an adaptive transmission method—a hybrid automatic repeat request (HARQ) protocol needs to be used, which is a technology that combines forward error correction (FEC) and an automatic repeat request (ARQ) protocol to implement reliable communication and improve a system throughput. Compared with a polar code with a fixed code rate, a polar code using the HARQ technology requires rate compatibility, that is, a code rate for encoding may be flexibly configured by changing a code length, and a to-be-sent bit may be flexibly selected depending on an expected code rate. Therefore, when the channel dynamically changes, the HARQ polar code is more efficient than a polar code with a fixed code rate that is designed for a worst channel. However, a length of the polar code proposed by Professor Arikan needs to meet a condition of being an integer power of 2, which brings severe challenges to compatibility in code lengths and code rates.

In an existing HARQ solution, a code word the same as that transmitted last time is transmitted during each retransmission, and a receive end adds up code words received in a plurality of times for decoding. The HARQ solution does not have an encoding gain though achieving a signal-to-noise ratio gain, and therefore has a relatively low throughput. Based on this, a HARQ polar code transmission solution based on an extended generator matrix is proposed in a conventional technology. A transmit end uses the extended generator matrix to generate code words whose code rates are continuously reduced for transmission, and a receive end combines code words received in a plurality of times into a long code for decoding, to obtain a relatively large encoding gain. However, in the solution, when a real physical channel has a relatively high signal-to-noise ratio, a throughput is relatively low because a same information bit is retransmitted each time.

SUMMARY

Embodiments of this application provide a polar code retransmission method and apparatus, to achieve an encoding gain in a HARQ polar code retransmission process and improve a throughput.

Specific technical solutions provided in the embodiments of this application are as follows.

According to a first aspect, a polar code retransmission method is provided. The method is performed by a transmit end, an encoding device, a chip, or a logic circuit. The method includes the following steps: Based on offline generated construction parameters used to generate polar codes in a plurality of transmissions, information bits in the transmissions are encoded to generate polar codes. A new information bit may be added during each retransmission. An information bit transmitted last time and a new information bit are encoded based on a construction parameter corresponding to a current transmission. After encoding, a different part in a current polar code from a polar code transmitted last time is transmitted. In this way, after receiving to-be-decoded information transmitted in several times, a decoding device performs combination, and decodes a combined code word. In this way, a code word characteristic of a polar code can be used to achieve an encoding gain in HARQ. Compared with an existing polar code HARQ solution, a part of information bits can be added during retransmission, thereby improving a system throughput.

In an embodiment, polar code encoding is performed on K first to-be-encoded bits based on a first construction parameter to obtain a first code word, where the first construction parameter includes a first information bit position set, elements in the first information bit position set are used to indicate positions of the K first to-be-encoded bits, and K is a positive integer. The first code word is sent to a decoding device. Information used to indicate that decoding of the first code word fails is received from the decoding device. Polar code encoding is performed on the K first to-be-encoded bits and K' second to-be-encoded bits based on a second construction parameter to obtain a second code word, where K' is a positive integer, the second construction parameter includes a second information bit position set, elements in the second information bit position set are used to indicate positions of the K first to-be-encoded bits and positions of the K' second to-be-encoded bits, an element that is in the second information bit position set and that is used to indicate a position of a first to-be-encoded bit is a sum of N and an element that is in the first information bit position set and that is used to indicate the position of the first to-be-encoded bit, N is a length of a mother code obtained through encoding during initial transmission, and N is an integer power of 2. A subcode in the second code word other than the first code word is sent to the decoding device. In this way, a code word characteristic of a polar code can be used to achieve an encoding gain in HARQ. Compared with an existing polar code HARQ solution, a part of information bits can be added during retransmission, thereby improving a system throughput.

In an embodiment, the first to-be-encoded bits include a first information bit and a first check bit, and the first check bit is used to check the first information bit. In this way, the decoding device may perform check based on the check bit, to determine whether an information bit obtained through decoding is correct.

In an embodiment, the second to-be-encoded bits include a second information bit. Alternatively, the second to-be-encoded bits include the second information bit and a second check bit, and the second check bit is used to check the first information bit and/or the second information bit. When the second check bit is used to check the second information bit, and the second check bit is added, because the second information bit is located ahead, effects of early stopping and path screening may be achieved by checking the second information bit by using the second check bit.

In an embodiment, the second to-be-encoded bits are different from the first to-be-encoded bits. A part of information bits are added during retransmission, so that a system throughput can be improved.

In an embodiment, the second to-be-encoded bits include a part of bits in the first to-be-encoded bits, and the part of bits are located at the first one or more of positions in the first information bit position set that are arranged in ascending order of reliability. In this way, when the decoding device performs decoding, to-be-decoded information corresponding to the second to-be-encoded bits is ahead of to-be-decoded information corresponding to the first to-be-encoded bits, and the decoding device performs check bit by bit. If information bits obtained by decoding the to-be-decoded information corresponding to the second to-be-encoded bits are successfully checked, a part that is in the second to-be-encoded bits and that are the same as a part of bits in the first to-be-encoded bits may be used as a known bit, and in a process of further decoding the first to-be-decoded information behind, a part of first information bits that is copied into the second to-be-encoded bits during encoding does not need to be decoded again, and is directly used as a frozen bit. When a signal-to-noise ratio is relatively low, a code rate may be further reduced, thereby improving a throughput.

In an embodiment, the first code word is a subcode of the second code word.

According to a second aspect, a polar code retransmission method is provided. The method is performed by a receive end, a decoding device, a chip, or a logic circuit. The method includes the following steps: receiving first to-be-decoded information from an encoding device; when failing to decode the first to-be-decoded information, sending, to the encoding device, information used to indicate that decoding of the first to-be-decoded information fails; receiving second to-be-decoded information from the encoding device; and decoding the first to-be-decoded information and the second to-be-decoded information. In this way, a code word characteristic of a polar code can be used to achieve an encoding gain in HARQ. Compared with an existing polar code HARQ solution, a part of information bits can be added during retransmission, thereby improving a system throughput.

In an embodiment, an information bit obtained through decoding is checked by using first check information. In this way, the decoding device may perform check based on a check bit, to determine whether an information bit obtained through decoding is correct.

In an embodiment, a first information bit obtained by decoding the first to-be-decoded information is checked by using first check information, and the first information bit and/or a second information bit obtained by decoding the second to-be-decoded information are/is checked by using second check information. When a second check bit is added, because the second information bit is located ahead, effects of early stopping and path screening may be achieved by checking the second information bit by using the second check bit.

In an embodiment, the second to-be-decoded information and the first to-be-decoded information are one piece of total to-be-decoded information, the decoding device decodes the total to-be-decoded information, and the second to-be-decoded information is decoded ahead of the first to-be-decoded information. Second information bits obtained by decoding the second to-be-decoded information are first checked, and if the check succeeds, a copied bit in the second information bits is used as a known bit, to further decode the first to-be-decoded information behind. The copied bit is an information bit that is the same as a part of first information bits and that is placed at a newly added information bit position during encoding. In this way, when the decoding device performs decoding, to-be-decoded information corresponding to the second to-be-encoded bits is ahead of to-be-decoded information corresponding to the first to-be-encoded bits, and the decoding device performs check bit by bit. If information bits obtained by decoding the to-be-decoded information corresponding to the second to-be-encoded bits are successfully checked, a part that is in the second to-be-encoded bits and that are the same as a part of bits in the first to-be-encoded bits may be used as a known bit when successfully checked, and in a process of further decoding the first to-be-decoded information behind, a part of first information bits that is copied into the second to-be-encoded bits during encoding does not need to be decoded again, and is directly used as a frozen bit for decoding. When a signal-to-noise ratio is relatively low, a code rate may be further reduced, thereby improving a throughput.

According to a third aspect, a polar code retransmission apparatus is provided, and the apparatus has functions of implementing the method according to any one of the first aspect and the embodiments of the first aspect. The functions may be implemented by hardware, or may be implemented by hardware executing corresponding software. The hardware or the software includes one or more modules corresponding to the foregoing functions.

In an embodiment, when some or all of the functions are implemented by hardware, the polar code retransmission apparatus includes: an input interface circuit, configured to obtain K first to-be-encoded bits and K' second to-be-encoded bits; a logic circuit, configured to perform the method in any one of the first aspect and the possible designs of the first aspect; and an output interface circuit, configured to output a first code word obtained after encoding, and a subcode in a second code word obtained after encoding other than the first code word.

Optionally, the polar code retransmission apparatus may be a chip or an integrated circuit.

In an embodiment, when some or all of the functions are implemented by software, the polar code retransmission apparatus includes: a memory, configured to store a program; and a processor, configured to execute the program stored in the memory. When the program is executed, the polar code retransmission apparatus may implement the method in any one of the first aspect and the possible designs of the first aspect.

Optionally, the memory may be a physically independent unit, or may be integrated with the processor.

In an embodiment, when some or all of the functions are implemented by software, the polar code retransmission apparatus includes a processor. A memory configured to store a program is located outside the polar code retransmission apparatus. The processor is connected to the memory by using a circuit/wire, and is configured to read and execute the program stored in the memory.

According to a fourth aspect, a polar code retransmission apparatus is provided. The apparatus has functions of implementing the method in any one of the second aspect and the embodiments of the second aspect. The functions may be implemented by hardware, or may be implemented by hardware executing corresponding software. The hardware or the software includes one or more modules corresponding to the foregoing functions.

In an embodiment, when some or all of the functions are implemented by hardware, the polar code retransmission apparatus includes: an input interface circuit, configured to obtain first to-be-decoded information and second to-be-decoded information; a logic circuit, configured to perform behavior of the decoding device in any one of the second aspect and the embodiments of the second aspect; and an output interface circuit, configured to output a decoding result.

Optionally, the polar code retransmission apparatus may be a chip or an integrated circuit.

In an embodiment, when some or all of the functions are implemented by software, the polar code retransmission apparatus includes: a memory, configured to store a program; and a processor, configured to execute the program stored in the memory. When the program is executed, the polar code retransmission apparatus may implement the method in any one of the first aspect and the embodiments of the first aspect.

Optionally, the memory may be a physically independent unit, or may be integrated with the processor.

In an embodiment, when some or all of the functions are implemented by software, the polar code retransmission apparatus includes a processor. A memory configured to store a program is located outside the polar code retransmission apparatus. The processor is connected to the memory by using a circuit/wire, and is configured to read and execute the program stored in the memory.

According to a fifth aspect, a wireless communication system is provided. The system includes an encoding device and a decoding device. The encoding device performs the method in the first aspect or the embodiments, and/or the decoding device performs the method in the second aspect or the embodiments.

According to a sixth aspect, a computer storage medium is provided, configured to store a computer program. The computer program includes instructions used to perform the method in any one of the first aspect, the second aspect, the embodiments of the first aspect, or the embodiments of the second aspect.

According to a seventh aspect, a computer program product including instructions is provided. When the computer program product runs on a computer, the computer is enabled to perform the methods in the foregoing aspects.

DESCRIPTION OF EMBODIMENTS

Embodiments of this application provide a polar code retransmission method and apparatus, to add a new information bit in each retransmission process during HARQ polar code transmission, and jointly encode a new information bit and a previously transmitted information bit, thereby improving a system throughput. The method and the apparatus are based on a same technical concept. Because a problem-resolving principle of the method is similar to that of the apparatus, mutual reference may be made to implementations of the apparatus and the method. Repeated parts are not described in detail again. In descriptions of the embodiments of this application, the term "and/or" describes an association relationship between associated objects and indicates that three relationships may exist. For example, A and/or B may indicate the following three cases: Only A exists, both A and B exist, and only B exists. The character "|" usually indicates an "or" relationship between the associated objects. In this application, "at least one" means one or more, and "a plurality of" means two or more. In addition, it should be understood that in the descriptions of this application, terms such as "first" and "second" are merely used for distinguishing and description, but should not be understood as indicating or implying relative importance, or should not be understood as indicating or implying a sequence.

The following describes in detail the embodiments of this application with reference to the accompanying drawings.

A polar code retransmission method provided in the embodiments of this application may be applied to a fifth generation (5G) communication system or various future communication systems. Specifically, for example, the most typical three communication scenarios of the 5G communication system include enhanced mobile broadband (eMBB), massive machine-type communications (mMTC), and ultra-reliable low-latency communication (URLLC).

Figure 1:
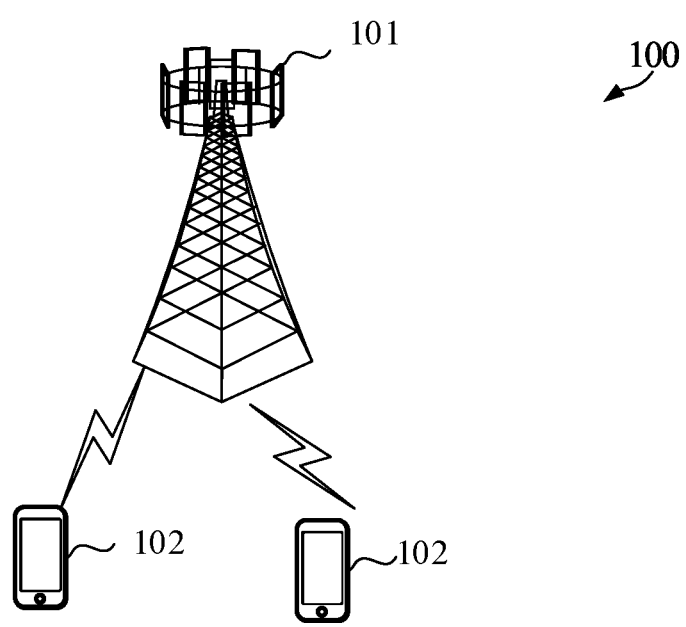
FIG. 1 is a schematic diagram of an architecture of a wireless communication system according to an embodiment of this application.

As shown in FIG. 1, the embodiments of this application may be applied to a wireless communication system 100, including a network device 101 and a terminal 102. When the network device 101 is a transmit end, the terminal 102 is a receive end. When the terminal 102 is a transmit end, the network device 101 is a receive end. The transmit end may also be referred to as an encoding device, and the receive end may also be referred to as a decoding device. The network device may be a base station, or may be a device integrating a base station and a base station controller, or may be another device having a similar communication function.

The network device 101 is a device that has a wireless transceiver function or a chip that may be disposed in the device. The device includes but is not limited to: an evolved NodeB (eNB), a radio network controller (RNC), a NodeB (NB), a base station controller (BSC), a base transceiver station (BTS), a home base station (for example, a home evolved NodeB, HNB), a baseband unit (BBU), an access point (AP) in a wireless fidelity (Wi-Fi) system, a wireless relay node, a wireless backhaul node, a transmission point (transmission and reception point, TRP or TP), or the like. The device may alternatively be a gNB or a transmission point (TRP or TP) in a 5G (for example, NR) system, or one antenna panel or one group (including a plurality of antenna panels) of antenna panels of a base station in a 5G system. The device may alternatively be a network node, for example, a baseband unit (BBU) or a distributed unit (distributed unit, DU), that constitutes a gNB or a transmission point.

In some deployments, the gNB may include a centralized unit (CU) and a DU. The gNB may further include a radio frequency unit (RU). The CU implements some functions of the gNB, and the DU implements some functions of the gNB. For example, the CU implements functions of a radio resource control (RRC) layer and a packet data convergence protocol (PDCP) layer, and the DU implements functions of a radio link control (RLC) layer, a media access control (MAC) layer, and a physical (PHY) layer. Information at the RRC layer eventually becomes information at the PHY layer (in other words, information sent through the PHY layer), or is converted from information at the PHY layer. Therefore, in this architecture, higher layer signaling, for example, RRC layer signaling or PDCP layer signaling, may also be considered as being sent by the DU or sent by the DU and the RU. It may be understood that the network device may be a CU node, a DU node, or a device including a CU node and a DU node. In addition, the CU may be allocated as a network device in a radio access network (RAN), or the CU may be allocated as a network device in a core network (CN). This is not limited herein.

The terminal may also be referred to as user equipment (UE), an access terminal, a subscriber unit, a subscriber station, a mobile station, a mobile console, a remote station, a remote terminal, a mobile device, a user terminal, a terminal, a wireless communication device, a user agent, or a user apparatus. The terminal in the embodiments of this application may be a mobile phone, a tablet (Pad), a computer having a wireless transceiver function, a virtual reality (VR) terminal, an augmented reality (AR) terminal, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, or the like. An application scenario is not limited in the embodiments of this application. In this application, a terminal having a wireless transceiver function and a chip that may be disposed in the terminal are collectively referred to as a terminal.

For ease of understanding the embodiments of this application, the following briefly describes a polar code and some characteristics of the polar code, and a design idea of this application follows the description.

(I) Basic Description of the Polar Code

An encoding policy of the polar code is to transmit information useful to a user through a noiseless channel, and transmit agreed information through a pure noisy channel, or transmit no information through a pure noisy channel. The polar code is also a linear block code. An encoding matrix of the polar code is $G_N$, and an encoding process is $x_1^N = u_1^N G_N$, where $u_1^N = (u_1, u_2, \ldots, u_N)$ is a binary row vector with a length N (namely, a code length), $G_N$ is a N×N a matrix, and $G_N = F_2^{\oplus(log_2(N))}$. $F_2^{\oplus(log_2(N))}$ is defined as a Kronecker product of $log_2 N$ matrices $F_2$. The matrix $$F_2 = \begin{bmatrix} 1 & 0 \\ 1 & 1 \end{bmatrix}.$$

In a process of encoding the polar code, one part of bits in $u_1^N$ are used to carry information, and are referred to as a set of information bits, where a set of indexes of the bits is denoted as A; and another part of bits are set to a fixed value pre-agreed upon between a receive end and a transmit end, and are referred to as a set of fixed bits or a set of frozen bits, where a set of indexes of the bits is indicated by a complementary set $A^c$ of A. The encoding process of the polar code is equivalent to $x_1^N = u_A G_N(A) \oplus u_{A^c} G_N(A^c)$. Herein, $G_N(A)$ is a sub-matrix obtained from rows corresponding to the indexes in the set A in $G_N$, and $G_N(A^c)$ is a sub-matrix obtained from rows corresponding to the indexes in the set $A^c$ in $G_N$. $u_A$ represents a set of information bits whose quantity is K in $u_1^N$. $u_{A^c}$ represents a set of fixed bits whose quantity is (N-K) in $u_1^N$, which are known bits. These fixed bits are usually set to 0. However, the fixed bits may be set randomly provided that the receive end and the transmit end have agreed in advance. Therefore, an encoded output of the polar code may be simplified as $x_1^N = u_A G_N(A)$. Herein, $u_A$ represents a set of information bits in $u_1^N$, $u_A$ represents a row vector of a length K, that is, $|A|=K$, $|\bullet|$ represents a quantity of elements in the set, K represents an information block size, $G_N(A)$ represents a submatrix obtained based on rows that are in $G_N$ and that correspond to indexes in the set A, and $G_A$, (A) is a K×N matrix.

A construction process of the polar code is a selection process of the set A, which determines performance of the polar code. The construction process of the polar code is usually as follows: It is determined, based on the mother code length N, that there are N polarized channels in total, corresponding to N rows of the encoding matrix respectively. Reliability of the polarized channels is calculated. Indexes of first K polarized channels with relatively high reliability are used as elements of the set A, and indexes corresponding to remaining (N-K) polarized channels are used as elements of the constant bit index set $A^c$. The set A determines positions of the information bits, and the set $A^c$ determines positions of the fixed bits.

(II) Recursive Characteristic of the Polar Code

A generator matrix of the polar code is a lower triangular matrix with a highly recursive structure. A generator matrix of a polar code of a length N is $G_N$, and a generator matrix $G_{2N}$ of a polar code of a length 2N may be obtained based on $G_N$, that is, $$G_{2N} = \begin{bmatrix} G_N & 0 \\ G_N & G_N \end{bmatrix}.$$

Polar code encoding is respectively performed on an information bit sequence $(u_N, \ldots, u_1)$ of the length N and an information bit sequence $(u_{2N}, \ldots u_{N+1}, u_N', \ldots u_1')$ of the length 2N to obtain polar codes $(c_N, \ldots, c_1)$ and $(c_{2N}, \ldots, c_{N+1}, c_N', \ldots, c_1')$. If $(u_N', \ldots, u_1') = (u_N, \ldots, u_1)$, $(C_N', \ldots, c_1') = (C_N, \ldots, c_1)$. That is, the last code word bits of the length N in a code word of the length 2N are a polar subcode of the length N.

The method designed in this application utilizes the recursive characteristic of the polar code, and also uses a PW offline construction algorithm to obtain a nesting characteristic of a sequence $Q_1^{N_{max}}$, as described in (III).

(III) Nesting characteristic of a polarization weight (PW) construction sequence of the polar code It is a nesting characteristic of a sequence $Q_1^{N_{max}}$ obtained by using the PW offline construction algorithm. To obtain a more flexible and practical polar code construction method, generally, a relatively long PW sequence is directly calculated. It is assumed that a longest code length of the polar code is $N_{max}$, and a subscript of a split sub-channel is $\{1, 2, \ldots, N_{max}\}$. First, the subscript of the split sub-channel i, i∈$\{1, 2, \ldots, N_{max}\}$ is expanded in binary mode, that is, $$i = B_{n-1}B_{n-2} \ldots B_1 B_0 + 1, B_j \in \{0,1\}, j \in \{0,1, \ldots, n-1\} \quad (1)$$

where n=$\log_2(N_{max})$, and reliability of the $i^{th}$ sub-channel is calculated by using the following formula (2):

$$W_i = \sum_{j=0}^{n-1} B_j * 2^{j*\frac{1}{4}}, i \in \{1, \cdots, N_{max}\} \quad (2)$$

Reliability of split sub-channels is recorded in a weight sequence $W_1^{N_{max}}$. Then, the split sub-channels are sorted in descending order of the reliability, and the sequence $Q_1^{N_{max}}$ is used to store subscript values of the sorted split sub-channels. For example, $N_{max}=8$, and a sequence $Q_1^8$ constructed based on the PW method is $\{8, 7, 6, 4, 5, 3, 2, 1\}$.

Sorting of the reliability of the split sub-channels calculated based on the PW offline construction algorithm meets the following relationships:

Inference 1: Sorting of subscripts (N+1 to 2N) of the second half split sub-channels of a polar code of a code length 2N is equal to sorting of subscripts of split sub-channels of a polar code of a code length N plus N.

In this application, sequence numbers 0 to N−1 are equivalent to sequence numbers 1 to N, which are merely expressed in different manners.

$Q_1^{2N}$ is used to construct a polar code of $C(K_2,2N)$. The first $(K_2)^{th}$ elements in the sequence $Q_1^{2N}$ are selected to transmit information. Elements that meet the conditions are put into a set $A_2$. Moreover, a quantity of elements that are in $A_2$ and that are located within a range of N+1 to 2N is counted, which is denoted as $K_1$, and the corresponding elements are put into a set $A_1'$. Next, $Q_1^N$ is used to construct a polar code of $C(K_1,N)$, and a set of split sub-channels of the polar code that are used to transmit information bits is $A_1$. Each element in $A_1$ is added with N to obtain an updated subscript set, which is denoted as $A_1''$. Then, based on inference 1, inference 2 can be derived.

Inference 2: The set $A_1'$ of subscripts of the split sub-channels of the second half (N+1 to 2N) of the code word $C(K_2,2N)$ that are used to place information bits is consistent with the updated set $A_1''$ of subscripts of the split sub-channels of the code word $C(K_1,N)$ that are used to transmit information.

It is assumed that a maximum quantity of transmissions of a HARQ system is $T_{max}=4$. When the last transmission fails, the transmit end performs retransmission. Each of the four transmissions has a same code word length. Lengths of new code words constructed in the four transmissions are respectively $N_1$, $N_2$, $N_3$, and $N_4$. $N_4=4N_1$, $N_3=3N_1$, and $N_2=2N_1$. In this application, a series of code words whose code rates are continuously reduced are designed. It is assumed that polar code parameters designed for the four transmissions are $C(K_1,N_1,A_1)$, $C(K_2,N_2,A_2)$, $C(K_3,N_3,A_3)$, and $C(K_4,N_4,A_4)$. Starting from the polar code $C(K_1,N_1,A_1)$ with an optimal code rate during initial transmission based on the recursive characteristic of the polar code, the equivalent polar codes $C(K_2,N_2,A_2)$, $C(K_3,N_3,A_3)$, and $C(K_4,N_4,A_4)$ for retransmissions are constructed. In this construction manner, the transmit end is allowed to jointly encode a new information bit and a previously transmitted information bit during each retransmission, and quantities of new information bits in retransmissions are respectively $K_2-K_1$, $K_3-K_2$, and $K_4-K_3$. The four constructed polar code words have the following two important properties, which are respectively the following (1) and (2).

(1) A nesting property is met.

$C(K_1,N_1,A_1) \subset C(K_2,N_2,A_2) \subset C(K_3,N_3,A_3) \subset C(K_4,N_4,A_4)$, that is, the code word $C(K_1,N_1,A_1)$ is a subcode of $C(K_2,N_2,A_2)$, the code word $C(K_2,N_2,A_2)$ is a subcode of $C(K_3,N_3,A_3)$ and $C(K_3,N_3,A_3)$ is a subcode of $C(K_4,N_4,A_4)$. In this way, during transmission, the transmit end needs to retransmit only a different part in a code word constructed in a current transmission from a code word constructed in a previous transmission. If each transmission has a same code word length, $N_4=4N_1$, $N_3=3N_1$, and $N_2=2N_1$, the first transmission has a code word length of $N_1$, the second transmission has a code word length of $N_2-N_1$, the third transmission has a code word length of $N_3-N_2$, and the fourth transmission has a code word length of $N_4-N_3$.

(2) $A_1$, $A_2$, $A_3$, and are all information bit position sets obtained by using the PW offline construction algorithm.

The code words, and $C(K_1,N_1,A_1)$, $C(K_2,N_2,A_2)$, $C(K_3,N_3,A_3)$, and $C(K_4,N_4,A_4)$ are standard polar codes based on the PW construction algorithm. In other words, when jointly decoding code words transmitted in several times, the receive end always decodes a complete standard polar code based on the PW construction algorithm.

To obtain polar codes meeting the properties (1) and (2), a code rate of a polar code in each transmission needs to be properly designed.

Known condition: The first transmission is performed by using the polar code $C(K_1,N_1,A_1)$ with the optimal code rate $R_1=K_1/N_1$. It is assumed that a maximum quantity of transmissions of a HARQ system is $T_{max}=4$, each transmission has a same code word length $N_4=4N_1$, $N_3=3N_1$, and $N_2=2N_1$.

Parameters to be solved: A code rate of an equivalent polar code for the second transmission is $R_2=K_2/N_2$, a code rate of an equivalent polar code for the third transmission is $R_3=K_3/N_3$, and a code rate of an equivalent polar code for the fourth transmission is $R_4=K_4/N_4$.

Based on inference 2, parameter design is performed in this application by using a method shown in the following Table 1.

TABLE 1

| Method: nested code word construction method |
| --- |
| Input: a sequence $Q_1^{4N_1}$ constructed by using the PW algorithm and an information bit position set $A_1$ ($A_1 \subset \{1,2,\ldots,N_1\}$, and $|A_1| = K_1$) of the polar code , and $C(K_1,N_1,A_1)$ based on the PW construction algorithm |

TABLE 1-continued

Method: nested code word construction method

Output: code rates $R_2$, $R_3$, and $R_4$ of equivalent polar codes for transmissions, and
information bit position sets $A_2$, $A_3$, and $A_4$ of the equivalent polar codes for the transmissions
 1. update subscripts of elements in the information bit position set $A_1$, that is, each element
    in $A_1$ is added with $3N_1$, to obtain an updated subscript set, which is denoted as $A_1'$
 2. collect statistics on positions at which elements in $A_1'$ appear in the sequence $Q_1^{4N_1}$,
    which are represented by using a set $P = \{p_1, p_2, ..., p_{K_1}\}$, where a variable index
    indicates a maximum value of elements in the set P, that is, index = max $\{p_1, p_2, ..., p_{K_1}\}$
 3. count_2 = 0, count_3 = 0, count_4 = 0
 4. for i = 1:1: index do
 5. if $Q_1^{4N_1}(i) > 2N_1$ and $Q_1^{4N_1}(i) <= 3N_1$
 6. count _ 2 + +
 7. else
 8. if $Q_1^{4N_1}(i) > N_1$ and $Q_1^{4N_1}(i) <= 2N_1$
 9. count _ 3 + +
10. else
11. if $Q_1^{4N_1}(i) > 1$ and $Q_1^{4N_1}(i) <= N_1$
12. count _ 4 + +
13. end for
14. $K_2 = K_1 + \text{count\_2}$, $K_3 = K_2 + \text{count\_3}$, and $K_4 = K_3 + \text{count\_4}$
15. construct the information bit position sets $A_2$, $A_3$, and $A_4$ of the polar codes
    $C(K_2, N_2, A_2)$, $C(K_3, N_3, A_3)$, and $C(K_4, N_4, A_4)$ by using the PW algorithm Based on the foregoing description, in the embodiments of this application, a construction parameter of a HARQ polar code is designed. For example, when a maximum quantity of transmissions of a HARQ system is $T_{max}=4$, according to the foregoing method, construction parameters used to generate polar codes during the four transmissions are determined. The construction parameter includes an information bit position set. For example, information bit position sets of polar codes generated in the four transmissions are respectively $A_1$, $A_2$, $A_3$, and $A_4$. Code rates $R_1$, $R_2$, $R_3$, and $R_4$ of the four transmissions may also be determined.

The idea of the embodiments of this application is as follows: Based on offline generated construction parameters used to generate polar codes in a plurality of transmissions, information bits in the transmissions are encoded to generate polar codes. A new information bit may be added during each retransmission. An information bit transmitted last time and a new information bit are encoded based on a construction parameter corresponding to a current transmission. After encoding, a different part in a current polar code from a polar code transmitted last time is transmitted. After receiving to-be-decoded information transmitted in several times, a decoding device performs combination, and decodes a combined code word. In this way, a code word characteristic of a polar code can be used to achieve an encoding gain in HARQ. Compared with an existing polar code HARQ solution, a part of information bits can be added during retransmission, thereby improving a system throughput. Certainly, the construction parameter may alternatively be generated online.

Based on the foregoing description, a polar code retransmission method provided in the embodiments of this application is described below in detail.

Figure 2:
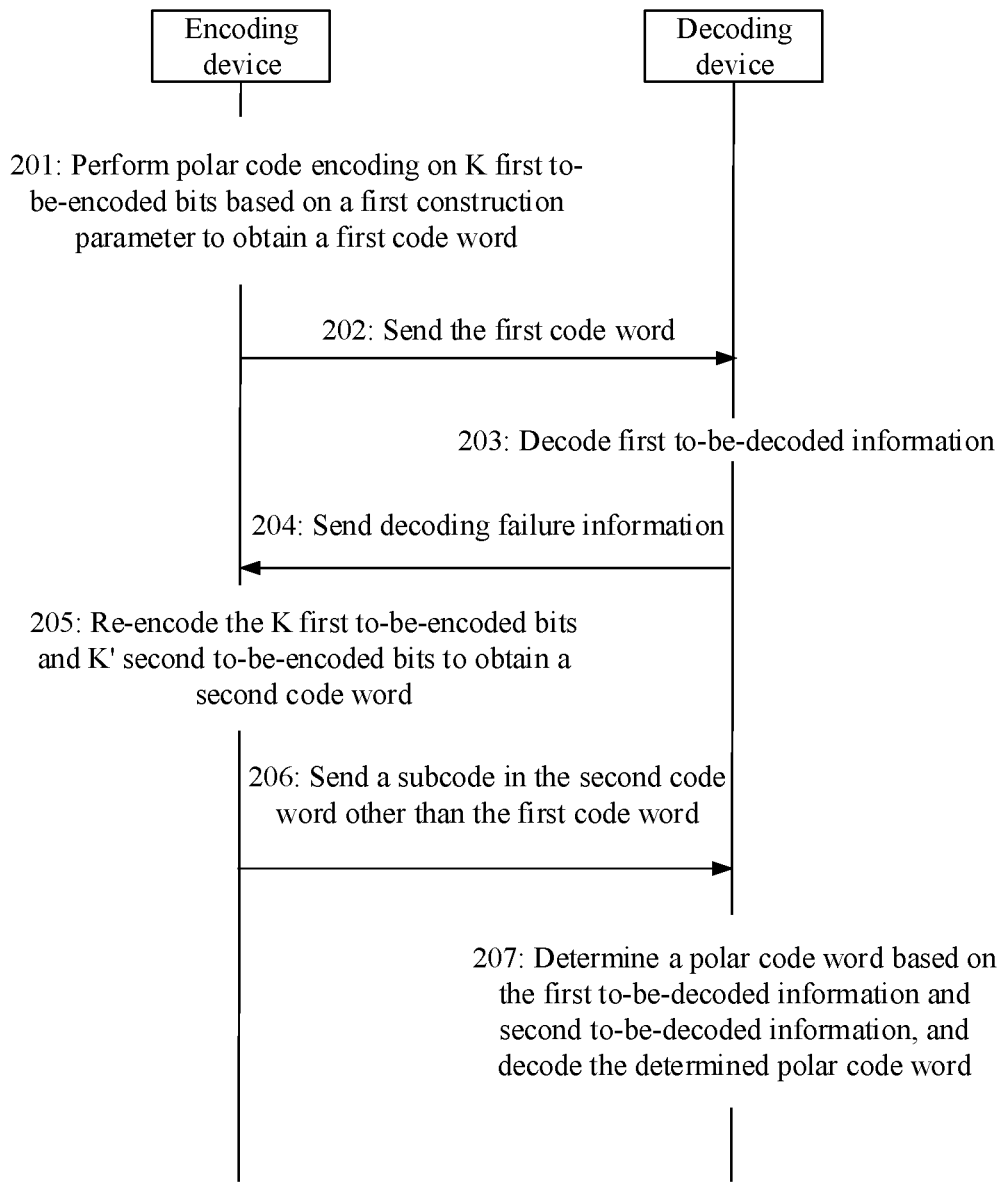
FIG. 2 is a first schematic flowchart of a polar code retransmission method according to an embodiment of this application.

As shown in FIG. 2, a procedure of the polar code retransmission method provided in the embodiments of this application is described as follows. The following method is performed by an encoding device and a decoding device. The encoding device may be a terminal, and the decoding device is a network device. Alternatively, the encoding device is a network device, and the decoding device is a terminal.

After the encoding device performs initial transmission, if decoding of the decoding device fails, the encoding device performs retransmission. The method embodiment shown in FIG. 2 is an encoding and decoding method for any two adjacent transmissions. For example, when decoding of initially transmitted data fails, retransmission is performed for the first time. Alternatively, when decoding of data retransmitted the first time fails, retransmission is performed for the second time. Alternatively, when decoding of data retransmitted the second time fails, retransmission is performed for the third time. A retransmission system may specify a maximum quantity of retransmissions. When the maximum quantity of retransmissions has not been reached, the encoding device may further encode and retransmit data. If the maximum quantity of retransmissions is reached, the encoding device may send the initially transmitted data to the decoding device. Alternatively, the decoding device notifies that decoding fails and ends the procedure.

S201: The encoding device performs polar code encoding on K first to-be-encoded bits based on a first construction parameter to obtain a first code word.

The K first to-be-encoded bits include an information bit and a check bit, which are denoted herein as a first information bit and a first check bit. A total quantity of the first information bit and the first check bit is K. K is a positive integer. The first check bit is used to check the first information bit.

The construction parameter is a parameter used in an encoding process. For example, the construction parameter includes an information bit position set A. Based on the foregoing (I), the information bit position set A is used to indicate a position of an information bit. In this application, the information bit position set may be used to indicate a position of a to-be-encoded bit.

The construction parameter may further include a quantity of to-be-encoded bits or a code length of a polar code.

The first construction parameter in step S201 includes a first information bit position set, and elements in the first information bit position set are used to indicate positions of the K first to-be-encoded bits.

In the following description, a parameter N is a length of a mother code obtained through encoding during initial transmission, and N is an integer power of 2.

For example, if the first code word is initially transmitted data, a length of a mother code obtained after encoding the K first to-be-encoded bits is N, and N is an integer power of 2. A length of the first code word is less than or equal to N, and the first code word may be a code word obtained after rate matching is performed on the mother code.

For another example, if the first code word is data retransmitted the first time, a length of a mother code obtained after encoding the K first to-be-encoded bits is 2N, and a length of the first code word is less than or equal to 2N. When the length of the first code word is less than 2N, the first code word may be a code word obtained after rate matching is performed on the mother code.

For another example, if the first code word is data retransmitted the second time, a length of a mother code obtained after encoding the K first to-be-encoded bits is 3N, and a length of the first code word is less than or equal to 3N. When the length of the first code word is less than 3N, the first code word may be a code word obtained after rate matching is performed on the mother code.

S202: The encoding device sends the first code word to the decoding device. The decoding device receives to-be-decoded information from the encoding device, which is denoted as first to-be-decoded information.

For example, the to-be-decoded information may be a log-likelihood ratio.

S203: The decoding device decodes the first to-be-decoded information.

The decoding device decodes the first to-be-decoded information, and checks, by using the first check bit, an information bit obtained through decoding. If the check succeeds, it indicates that decoding succeeds or transmission succeeds. If the check fails, it indicates that decoding fails or transmission fails.

S204: When failing to decode the first to-be-decoded information, the decoding device sends, to the encoding device, information used to indicate that decoding of the first to-be-decoded information fails. The encoding device receives, from the decoding device, the information used to indicate that decoding of the first to-be-decoded information fails.

When decoding fails, an indication message is returned. For example, the information used to indicate that decoding of the first to-be-decoded information fails is negative acknowledgment (NACK) information.

On the contrary, when successfully decoding the first to-be-decoded information, the decoding device returns, to the encoding device, information used to indicate decoding of the first to-be-decoded information succeeds, for example, an acknowledgment (ACK) response message.

S205: After receiving the information used to indicate that decoding of the first to-be-decoded information fails, the encoding device re-encodes the K first to-be-encoded bits and K' second to-be-encoded bits to obtain a second code word.

After receiving the information used to indicate that decoding of the first to-be-decoded information fails, the encoding device performs retransmission. In this application, the encoding device adds a new information bit in a retransmission process. The K first to-be-encoded bits are carried in the last transmission, and the K first to-be-encoded bits and the K' second to-be-encoded bits are re-encoded during retransmission.

The second to-be-encoded bits are different from the first to-be-encoded bits, or in other words, an information bit in the second to-be-encoded bits is different from the information bit in the first to-be-encoded bits. In this way, a new information bit can be transmitted, reducing redundancy in retransmission.

The second to-be-encoded bits include a part of bits in the first to-be-encoded bits, and in an encoding process of the last transmission, the part of bits are located at the first one or more of positions in the first information bit position set that are arranged in ascending order of reliability.

The encoding device obtains an offline stored construction parameter, determines a construction parameter that needs to be used for encoding in a current retransmission, which is denoted as a second construction parameter. The second construction parameter includes a second information bit position set, and elements in the second information bit position set are used to indicate positions of the K first to-be-encoded bits and positions of the K' second to-be-encoded bits. Based on the foregoing description of the nesting characteristic, an element that is in the second information bit position set and that is used to indicate a position of a first to-be-encoded bit is a sum of N and an element that is in the first information bit position set and that is used to indicate the position of the first to-be-encoded bit. Herein, N is a length of a mother code obtained after encoding during initial transmission, and N is an integer power of 2.

The encoding device re-encodes the K first to-be-encoded bits and the K' second to-be-encoded bits based on the second construction parameter, to obtain the second code word. Actually, the first code word is a subcode of the second code word.

The second to-be-encoded bits may include only information bits.

Alternatively, the second to-be-encoded bits may include an information bit and a check bit, which are denoted as a second information bit and a second check bit.

The second check bit may be used to check the first information bit and/or the second information bit.

S206: The encoding device sends a subcode in the second code word other than the first code word to the decoding device. The decoding device receives second to-be-decoded information from the encoding device.

Because the first code word has been transmitted last time, the encoding device may transmit a subcode in the second code word other than the first code word this time.

S207: After receiving the second to-be-decoded information from the retransmission, the decoding device decodes the first to-be-decoded information and the second to-be-decoded information.

On an encoding side, the encoding device jointly encodes the K first to-be-encoded bits and the K' second to-be-encoded bits, and performs polar code encoding in a normal encoding manner. Therefore, the decoding device may jointly decode the first to-be-decoded information received last time and the second to-be-decoded information received this time. For example, decoding is performed in combination with log-likelihood ratios received in the two times to obtain information bits.

In an encoding process, the second to-be-encoded bits may or may not include a check bit. Therefore, the decoding device needs to determine a check relationship during decoding. If the second to-be-encoded bits do not include a check bit, the decoding device uses the first check bit to check the information bit transmitted last time, which does not cause a large loss to decoding performance because a quantity of first information bits transmitted last time is much more than a quantity of second information bits transmitted this time. If the second to-be-encoded bits include a check bit, the decoding device uses the first check bit to check the first information bit transmitted last time, and may further use the second check bit to check the first information bit and/or the second information bit transmitted this time. Based on two check results of the check, if the check succeeds, it indicates that decoding succeeds; otherwise, decoding fails. When the second check bit is used to check only the second information bit, and the second check bit is added, because the second information bit is located ahead, effects of early stopping and path screening may be achieved by checking the second information bit by using the second check bit.

When decoding fails, when determining that the maximum quantity of retransmissions is not reached, the decoding device may further return decoding failure information to the encoding device. After receiving the decoding failure information, the encoding device further performs retransmission. A retransmission method is the same as that described above.

The foregoing described embodiment illustrates a process of two adjacent transmissions. In an actual application, the HARQ system may have a maximum quantity of retransmissions. Based on the maximum quantity of retransmissions, the encoding device and the decoding device perform polar code retransmission based on the foregoing method.

The polar code retransmission method in this application is further described below in detail with reference to a specific application scenario.

Figures 3A, 3B, 3C:
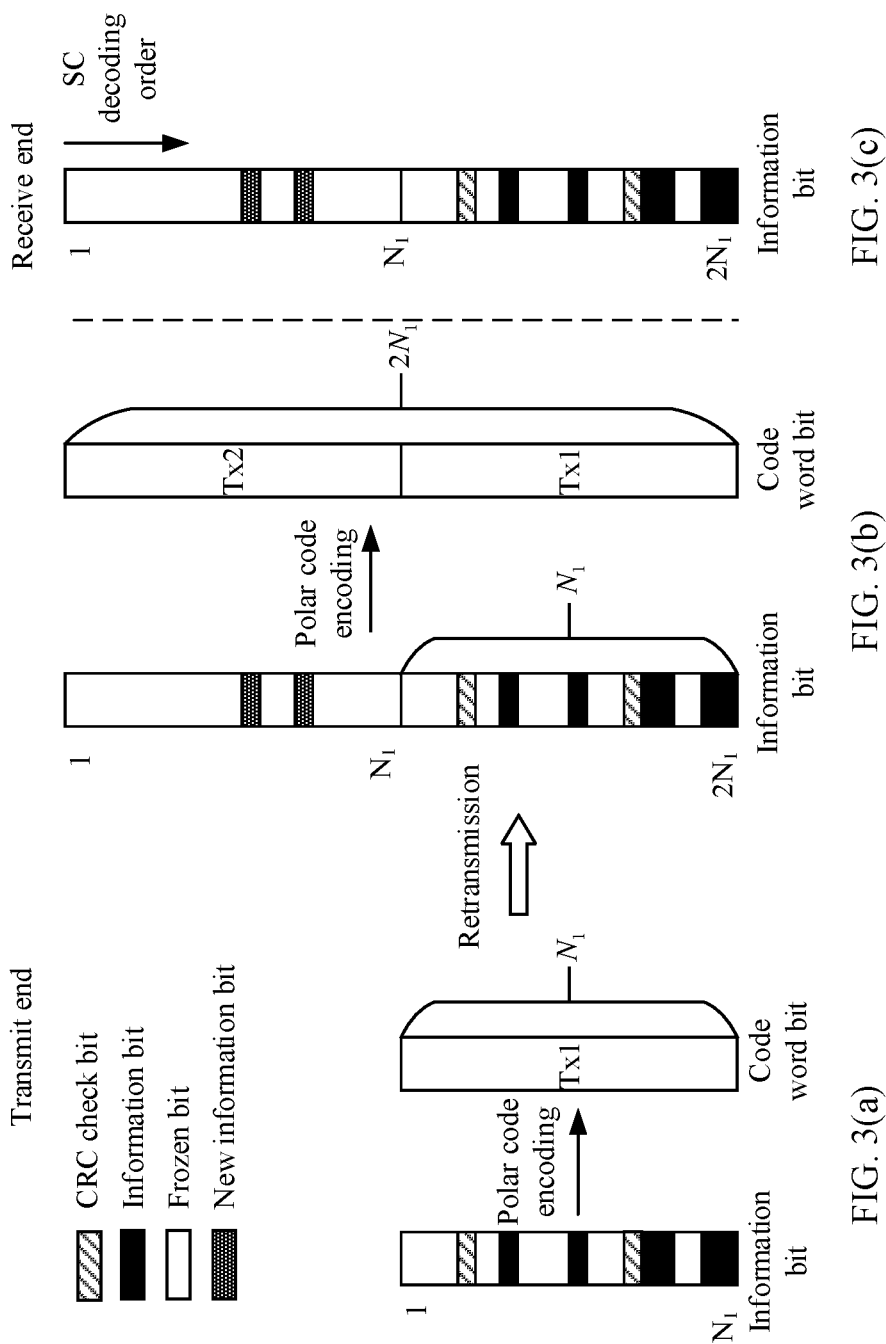
FIG. 3(a) to FIG. 3(c) are a second schematic flowchart of a polar code retransmission method according to an embodiment of this application.

As shown in FIG. 3($a$) to FIG. 3($c$), the following describes a process of encoding and decoding during the first transmission. The first transmission means that to-be-sent data is initially transmitted, rather than retransmitted.

For example, the maximum quantity of transmissions of the HARQ system is $T_{max}=4$ In the first transmission, a polar code $C(K_1,N_1,A_1)$ with an optimal code rate $R_1=K_1/N_1$ is used for transmission, $K_1$ is a quantity of to-be-encoded bits, $N_1$ is a length of a code word obtained through encoding, and $A_1$ is an information bit position set. Code rates of equivalent polar codes for subsequent retransmissions are determined based on the nested code word construction method shown in Table 1, to obtain information bit position sets $A_2$, $A_3$, and $A_4$ in the retransmissions. FIG. 3($a$) to FIG. 3($c$) are a schematic diagram of encoding and decoding for the first transmission and the second transmission. In FIG. 3($a$) to FIG. 3($c$), a transmit end is an encoding device, and a receive end is a decoding device.

In the first transmission, a polar code with an optimal code rate that matches a current channel state is used, and the code rate is $K_1/N_1$. FIG. 3($a$) is a schematic diagram of encoding in the first transmission. The encoding in the first transmission includes $K_1-m$ information bits. The encoding device first performs check encoding on the $K_1-m$ information bits to generate m check bits, for example, performs cyclic redundancy check (CRC) check encoding to generate m CRC check bits. The m generated check bits are added behind the $K_1-m$ information bits, which are sent to a polar code encoder for encoding. A code word obtained after encoding is $C(K_1,N_1,A_1)$, which is sent to a channel for sending. $A_1$ is an information bit position set of a polar code transmitted the first time. Positions of the information bits, frozen bits, and the check bits are shown in FIG. 3($a$). The transmit end is represented by TX, and a code word transmitted the first time is represented by Tx1.

The receive end decodes received to-be-decoded information (for example, a log-likelihood ratio) by using a cyclic redundancy check aided successive cancellation list (CA-SCL) decoder, and performs CRC check on information bits obtained through decoding. If the CRC check succeeds, it indicates that decoding succeeds or transmission succeeds this time, and the receive end returns an acknowledgment (ACK) response. If the CRC check fails, the receive end discards the received data and returns NACK information. The transmit end receives the NACK information, and performs retransmission.

The following describes a process of encoding and decoding during retransmission.

FIG. 3($b$) is a schematic diagram of encoding in the second transmission, that is, the first retransmission. The transmit end adds each element in the information bit position set $A_1$ of the polar code transmitted the first time with $N_1$ to obtain an updated subscript set, which is denoted as $A_1'$. In the second transmission, new information bits are placed in a set $A_2-A_1'$, whose size is $K_2-K_1$ bits. Moreover, information bits of a part of $N_1+1$ to $2N_1$ in the second transmission are the same as the information bits in the first transmission. $A_2$ is a construction parameter for encoding in the second transmission, and is a position set of the information bits and the check bits in the first transmission and the information bits newly added in the second transmission. A code word $C(K_2,N_2,A_2)$ is obtained after polar code encoding is performed based on $A_2$. A length of the code word $C(K_2,N_2,A_2)$ is $2N_1$. Based on a recursive structure of the polar code, it can be learned that the second half of the code word $C(K_2,N_2,A_2)$ is the same as the code word $C(K_1,N_1,A_1)$. The transmit end needs to transmit only the first half (0 to $N_1-1$) of the code word $C(K_2,N_2,A_2)$. Both a code word length of the second transmission and a code word length of the first transmission are $N_1$, and a code word transmitted the second time is a newly added part corresponding to Tx2. It can be learned that the polar code obtained in this encoding manner meets the nesting property.

Retransmission is performed based on a code rate and an information bit position set of an equivalent polar code determined for subsequent retransmission by using the nested code word construction method shown in Table 1, so that the receive end may combine log-likelihood ratios received from the two transmissions (Tx1 and Tx2) to form to-be-decoded information corresponding to the polar code $C(K_2,N_2,A_2)$ and perform CA-SCL decoding. It should be noted that, in this embodiment, the CRC check bits check only the information bits transmitted the first time, and do not check the newly transmitted information bits. Therefore, the receive end needs to determine a check relationship during decoding. Although the CRC check bits check only the information bits transmitted the first time during decoding for the second transmission, this does not cause a large loss to decoding performance, because a quantity of the information bits in the first transmission is much more than a quantity of the new information bits in the second transmission.

The encoding and decoding processes of the first transmission and the second transmission shown in FIG. 3($a$) to FIG. 3($c$) are actually similar to encoding and decoding methods of the third transmission and the fourth transmission. The following describes a process of the following four transmissions by using FIG. 4. Code words of the four transmissions are respectively a code word $C(K_1,N_1,A_1)$, a code word $C(K_2,N_2,A_2)$, a code word $C(K_3,N_3,A_3)$, and a code word $C(K_4,N_4,A_4)$.

Figure 4:
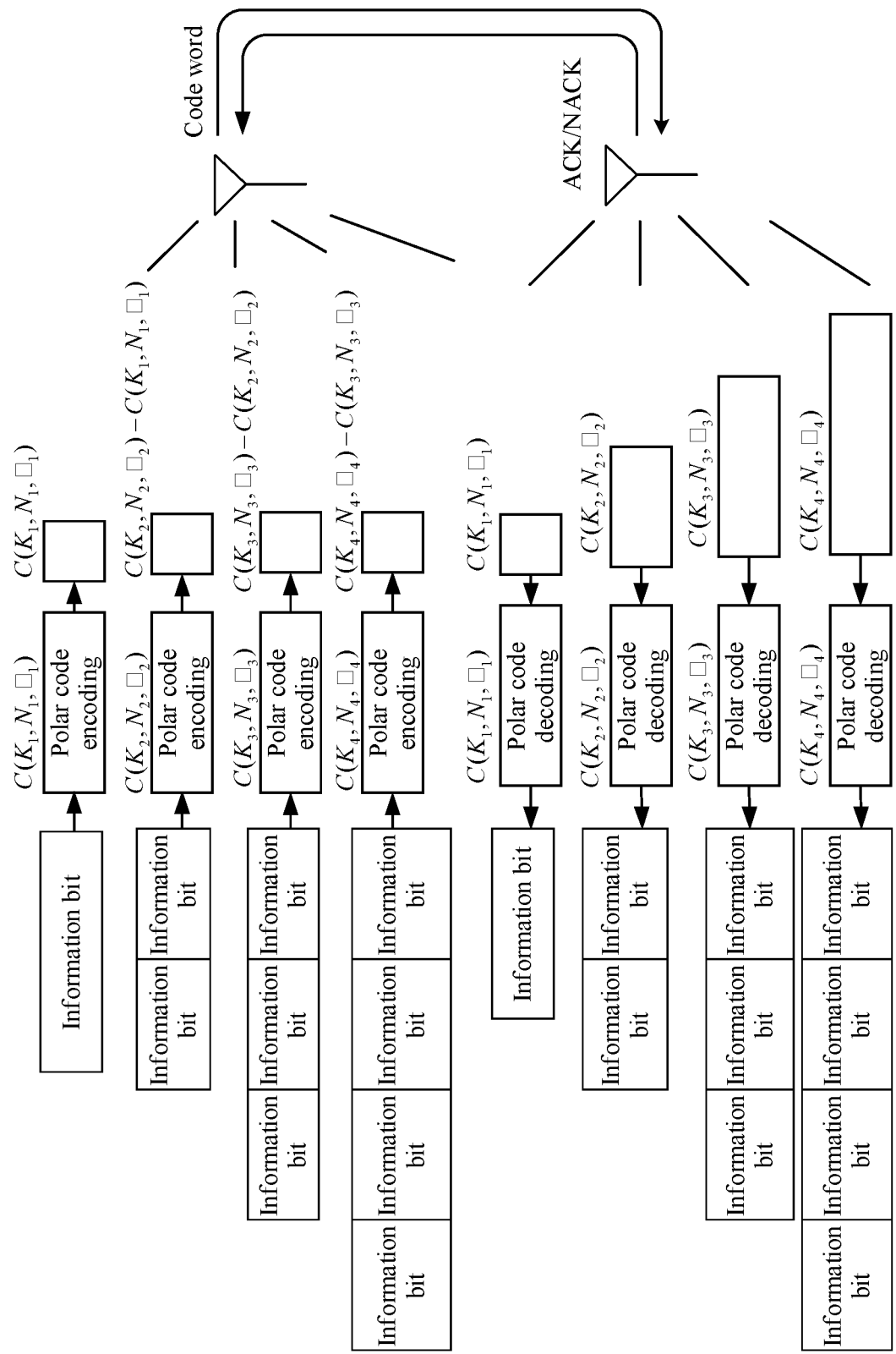
FIG. 4 is a schematic flowchart of four transmissions according to an embodiment of this application.

FIG. 4 is a schematic diagram of a solution for four polar code HARQ transmissions. Because the code word $C(K_1,N_1,A_1)$ is a subcode of $C(K_2,N_2,A_2)$, $C(K_2,N_2,A_2)$ includes all code word bits in $C(K_1,N_1,A_1)$. When the first transmission fails, the transmit end needs to retransmit only a different part in $C(K_2,N_2,A_2)$ from the code word $C(K_1,N_1,A_1)$, that is, $C(K_2,N_2,A_2)-C(K_1,N_1,A_1)$. During decoding, the receive end needs to combine the code word in the second transmission and the code word in the first transmission to form the polar code $C(K_2,N_2,A_2)$ for decoding. If the second transmission fails, a different part in $C(K_3,N_3,A_3)$ from the code word $C(K_2,N_2,A_2)$, that is, $C(K_3,N_3,A_3)-C(K_2,N_2,A_2)$, is transmitted the third time. The receive end combines all the code words received from the three transmissions to form the polar code $C(K_3,N_3,A_3)$ for decoding. If the third transmission fails, a different part in $C(K_4,N_4,A_4)$ from the code word $C(K_3,N_3,A_3)$, that is, $C(K_4,N_4,A_4)-C(K_3,N_3,A_3)$, is transmitted the fourth time. The receive end combines all the code words received from the four transmissions to form the polar code $C(K_4,N_4,A_4)$ for decoding.

A case is considered as follows: The code word $C(K_3,N_3,A_3)$ obtained after the third transmission is equivalent to puncturing the first ¼ part of a code word $C(K_3,N_3,A_{3'})$ of a length $N_4$. The puncturing is removing the first ¼ part. $A_{3'}$ is obtained by adding each element in $A_3$ with $N_1$. In this case, a code rate is $K_3/N_4$. Another case is considered as follows: $C(K_4,N_4,A_4)-C(K_3,N_3,A_3)$ rather than $C(K_3,N_3,A_3)-C(K_2,N_2,A_2)$ transmitted in the third transmission. In this case, the code word is also equivalent to puncturing a code word of the length $N_4$ (puncturing a part of the first ¼ to ½), but this code word of the length $N_4$ is $C(K_4,N_4,A_4)$ with a code rate $K_4/N_4$ that is higher than that in the case considered above. Therefore, in the third transmission, the part of $C(K_4,N_4,A_4)-C(K_3,N_3,A_3)$ may be transmitted, which is a solution with a higher code rate.

Figure 5:
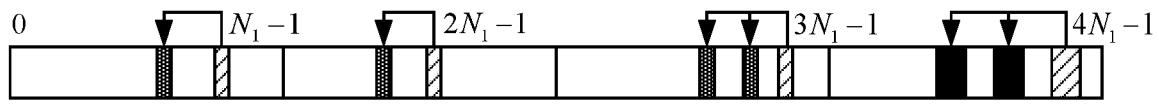
FIG. 5 is a schematic diagram of information bit distribution of four transmissions according to an embodiment of this application.

The receive end combines, into a code word for joint decoding, to-be-decoded information received this time and to-be-decoded information that is previously received but fails to be decoded, and checks information bits obtained after decoding. In this embodiment of this application, a retransmitted code word may include a new information bit different from an information bit transmitted last time, and may also include a check bit for checking the new information bit. FIG. 5 shows that an information bit and a check bit are carried in four transmissions. The longest code word shown in FIG. 5 is a code word obtained through encoding in the fourth transmission. Hierarchically, a part shown in $3N_1$ to $4N_1-1$ in FIG. 5 is transmitted the first time. After receiving to-be-decoded information of the first transmission, the decoding device performs decoding, and checks, by using a check bit, an information bit obtained through decoding. When the check fails, decoding failure information is returned to the transmit end. After receiving the decoding failure information, the encoding device performs re-encoding based on a construction parameter to obtain a code word shown in $2N_1$ to $4N_1-1$, and adds a new information bit and a check bit to a part of $2N_1$ to $3N_1-1$. In FIG. 5, an arrow indicates a check relationship, and a check bit is used to check an information bit pointed by the arrow. In the second transmission, only a part different from that in the first transmission, that is, a code word of the part of $2N_1$ to $3N_1-1$, is transmitted. After receiving to-be-decoded information from retransmission (that is, the second transmission), the decoding device jointly decodes the to-be-decoded information and the to-be-decoded information received in the first time, and checks, by using two groups of check bits, information bits obtained through decoding, to obtain a check result. When the check result is decoding failure, decoding failure information is returned to the encoding device. After receiving the decoding failure information, the encoding device performs re-encoding based on a construction parameter to obtain a code word shown in $N_1-1$ to $4N_1-1$, and adds a new information bit and a check bit to a part of $N_1$ to $2N_1-1$. In FIG. 5, an arrow indicates a check relationship, and a check bit is used to check an information bit pointed by the arrow. In the third transmission, only a part different from those in the previous two transmissions, that is, a code word of the part of $N_1$ to $2N_1-1$, is transmitted. After receiving to-be-decoded information from retransmission (that is, the third transmission), the decoding device jointly decodes the to-be-decoded information and the to-be-decoded information received in the first time and the second time, and checks, by using three groups of check bits, information bits obtained through decoding, to obtain a check result. When the check result is decoding failure, decoding failure information is returned to the encoding device. After receiving the decoding failure information, the encoding device performs re-encoding based on a construction parameter to obtain a code word shown in 0 to $4N_1-1$, and adds a new information bit and a check bit to a part of 0 to $N_1-1$. In FIG. 5, an arrow indicates a check relationship, and a check bit is used to check an information bit pointed by the arrow. In the fourth transmission, only a part different from those in the previous three transmissions, that is, a code word of the part of 0 to $N_1-1$, is transmitted. After receiving to-be-decoded information from retransmission (that is, the fourth transmission), the decoding device jointly decodes the to-be-decoded information and the to-be-decoded information received in the first time, the second time, and the third time, and checks, by using four groups of check bits, information bits obtained through decoding, to obtain a check result. If the system limits the maximum quantity of transmissions to 4, it is determined that decoding fails when the check fails. If the system limits the maximum quantity of transmissions to be greater than 4, when the check fails, decoding failure information is further returned to the encoding device, and re-encoding and decoding are performed based on a method similar to above. A quantity of retransmissions to which the method provided in this application may be applied is not limited.

In the example shown in FIG. 5, a new check bit is added in each retransmission. Certainly, no check bit may be transmitted, and only a new information bit is transmitted. As the new check bit is added, newly transmitted valid information bits are reduced. When a plurality of retransmissions are performed, and a quantity of newly added information bits is less than that in the first transmission, it may be considered that no new check bit is used, or it may be considered that no new information bit is added in retransmission (and certainly, no new check bit is used).

Figure 6:
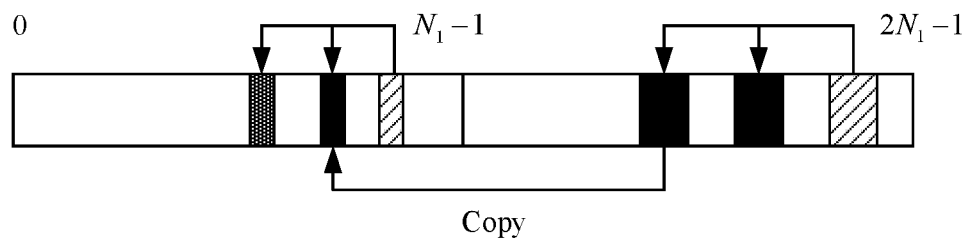
FIG. 6 is a schematic diagram of information bit distribution of two retransmissions according to an embodiment of this application.

In the foregoing example, the new information bit in each retransmission is an information bit different from an information bit in one or more previous transmissions. In this embodiment of this application, another possible implementation is further provided. That is, a part of bits (decoded as copied bits) in information bits in one or more previous transmissions are placed at a part of positions of information bits in each retransmission, and new information bits different from the information bits in the one or more previous transmissions are placed at another part of positions. The encoding device performs CRC encoding on the copied bits and the new information bits together, then performs polar code encoding, and retransmits a code word obtained after encoding. As shown in FIG. 6, two transmissions are used as an example. The longest code word shown in FIG. 6 is a code word obtained through encoding in the second transmission. During retransmission, an information bit on a sub-channel with relatively low reliability in the last transmission is placed at an information bit position of a part of 0 to $N_1-1$, and a new information bit is placed at another information bit position, and a new check bit may also be placed, or no new check bit may be placed. After the copied information bit in the last transmission, the new information bit, and the new check bit are placed, encoding is performed based on a construction parameter to generate a code word of a length $2N_1$. Only a subcode of the part of 0 to $N_1-1$ is transmitted during retransmission. During decoding, the decoding device first checks bits in the part of 0 to $N_1-1$. If the check on the bits in the part of 0 to $N_1-1$ succeeds, the copied bit in the part of 0 to $N_1-1$ may be used as a known bit for decoding a part of $N_1-1$ to $2N_1-1$. In this way, when the decoding device performs decoding, to-be-decoded information corresponding to the second to-be-encoded bits is ahead of to-be-decoded information corresponding to the first to-be-encoded bits, and the decoding device performs check bit by bit. If information bits obtained by decoding the to-be-decoded information corresponding to the second to-be-encoded bits are successfully checked, a copied bit in the second to-be-encoded bits may be used as a known bit when successfully checked, and in a process of further decoding the first to-be-decoded information behind, a part of first information bits that is copied into the second to-be-encoded bits during encoding does not need to be decoded again, and is directly used as a frozen bit. When a signal-to-noise ratio is relatively low, a code rate may be further reduced, thereby improving a throughput.

Figure 7:
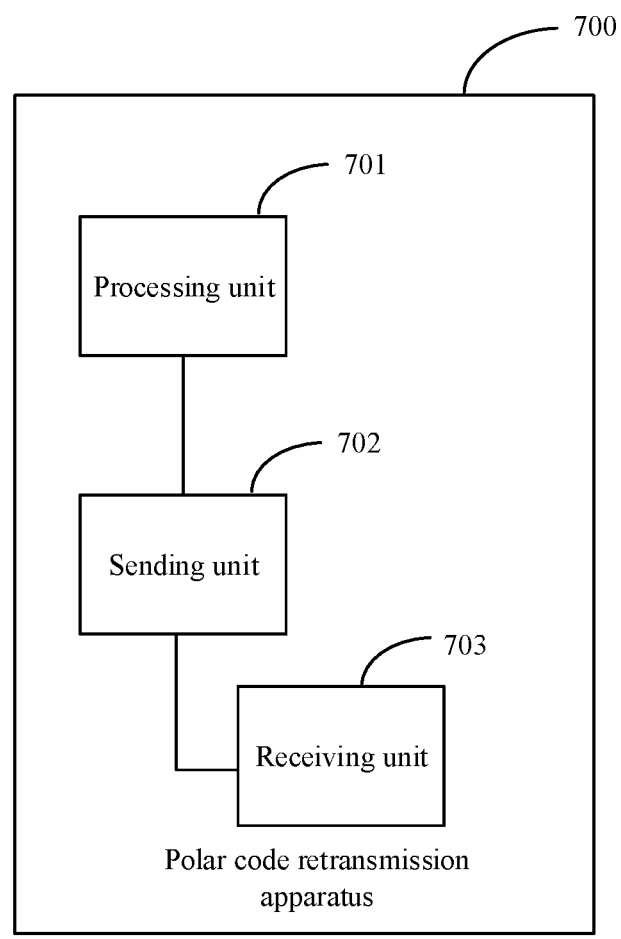
FIG. 7 is a first schematic diagram of a structure of a polar code retransmission apparatus according to an embodiment of this application.

Based on a same technical concept, as shown in FIG. 7, an embodiment of this application further provides a polar code retransmission apparatus 700. The polar code retransmission apparatus 700 may be configured to perform operations performed by the encoding device or the decoding device in the foregoing method embodiment. The polar code retransmission apparatus 700 includes a processing unit 701, a sending unit 702, and a receiving unit 703.

When operations performed by the encoding device in the foregoing method embodiment are performed:

The processing unit 701 is configured to perform polar code encoding on K first to-be-encoded bits based on a first construction parameter to obtain a first code word, where the first construction parameter includes a first information bit position set, elements in the first information bit position set are used to indicate positions of the K first to-be-encoded bits, and K is a positive integer.

The sending unit 702 is configured to send the first code word to a decoding device.

The receiving unit 703 is configured to receive, from the decoding device, information used to indicate that decoding of the first code word fails.

The processing unit 701 is further configured to perform polar code encoding on the K first to-be-encoded bits and K' second to-be-encoded bits based on a second construction parameter to obtain a second code word, where K' is a positive integer, the second construction parameter includes a second information bit position set, elements in the second information bit position set are used to indicate positions of the K first to-be-encoded bits and positions of the K' second to-be-encoded bits, an element that is in the second information bit position set and that is used to indicate a position of a first to-be-encoded bit is a sum of N and an element that is in the first information bit position set and that is used to indicate the position of the first to-be-encoded bit, N is a length of a mother code obtained through encoding during initial transmission, and N is an integer power of 2.

The sending unit 702 is further configured to send a subcode in the second code word other than the first code word to the decoding device.

Optionally, the first to-be-encoded bits include a first information bit and a first check bit, and the first check bit is used to check the first information bit.

Optionally, the second to-be-encoded bits include a second information bit.

Alternatively, the second to-be-encoded bits include the second information bit and a second check bit, and the second check bit is used to check the first information bit and/or the second information bit.

Optionally, the second to-be-encoded bits are different from the first to-be-encoded bits.

Optionally, the second to-be-encoded bits include a part of bits in the first to-be-encoded bits, and the part of bits are located at the first one or more of positions in the first information bit position set that are arranged in ascending order of reliability.

Optionally, the first code word is a subcode of the second code word.

When operations performed by the decoding device in the foregoing method embodiment are performed:

The receiving unit 703 is configured to receive first to-be-decoded information from an encoding device.

The processing unit 701 is configured to decode the first to-be-decoded information.

The sending unit 702 is configured to: when the processing unit fails to decode the first to-be-decoded information, send, to the encoding device, information used to indicate that decoding of the first to-be-decoded information fails.

The receiving unit 703 is configured to receive second to-be-decoded information from the encoding device.

The processing unit 701 is further configured to decode the first to-be-decoded information and the second to-be-decoded information.

Optionally, the processing unit 701 is further configured to check, by using first check information, an information bit obtained through decoding.

Optionally, the processing unit 701 is further configured to check, by using first check information, a first information bit obtained by decoding the first to-be-decoded information, and check, by using second check information, the first information bit and/or a second information bit obtained by decoding the second to-be-decoded information.

Optionally, the processing unit 701 is further configured to: check second information bits obtained by decoding the second to-be-decoded information, and if the check succeeds, use a part of the second information bits that is the same as a first information bit as a known bit; and decode the first to-be-decoded information based on the known bits.

Figure 8:
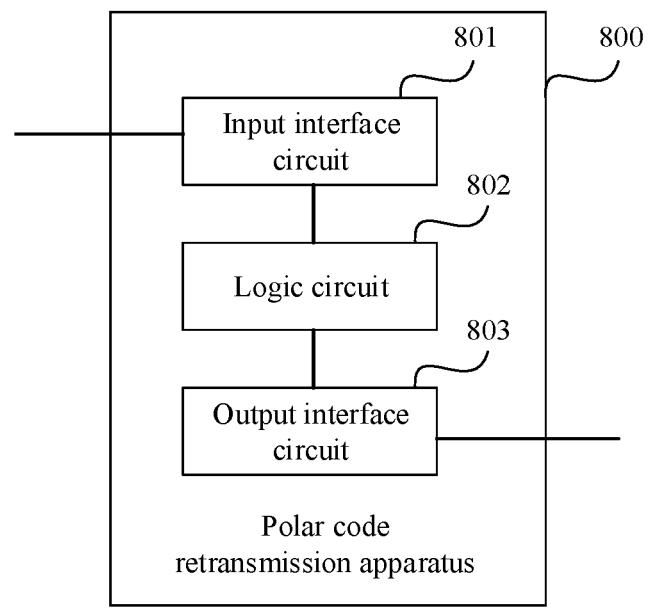
FIG. 8 is a second schematic diagram of a structure of a polar code retransmission apparatus according to an embodiment of this application.

Based on a same technical concept, as shown in FIG. 8, an embodiment of this application further provides a polar code retransmission apparatus 800. The polar code retransmission apparatus 800 is configured to perform operations performed by the encoding device or the decoding device in the foregoing method embodiment. The polar code retransmission method in the foregoing embodiment may be partially or entirely implemented by hardware or software. When the polar code retransmission method is implemented by hardware, the polar code retransmission apparatus 800 includes an input interface circuit 801, a logic circuit 802, and an output interface circuit 803.

When operations performed by the encoding device in the foregoing method embodiment are performed: The input interface circuit 801 is configured to obtain K first to-be-encoded bits and K' second to-be-encoded bits. The logic circuit 802 is configured to perform the method performed by the encoding device in the foregoing method embodiment. For details, refer to the description in the foregoing method embodiment. Details are not described herein again. The output interface circuit 803 is configured to output a first code word obtained after encoding, and a subcode in a second code word obtained after encoding other than the first code word.

When operations performed by the decoding device in the foregoing method embodiment are performed: The input interface circuit 801 is configured to obtain first to-be-decoded information and second to-be-decoded information. The logic circuit 802 is configured to perform the method performed by the decoding device in the foregoing method embodiment. For details, refer to the description in the foregoing method embodiment. Details are not described herein again. The output interface circuit 803 is configured to output a decoding result.

Optionally, during specific implementation, the polar code transmission apparatus 800 may be a chip or an integrated circuit.

Figure 9:
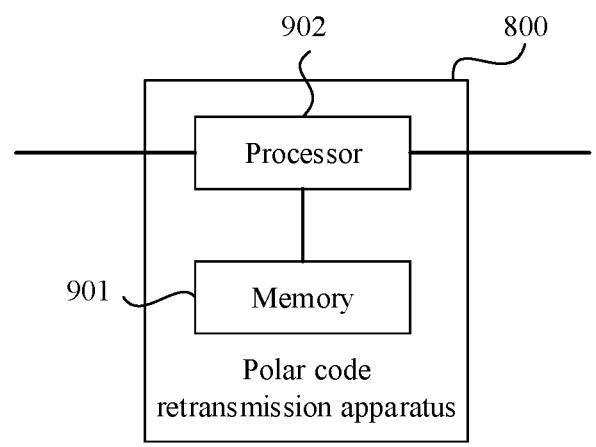
FIG. 9 is a third schematic diagram of a structure of a polar code retransmission apparatus according to an embodiment of this application.

Optionally, when some or all steps of the polar code retransmission method in the foregoing embodiments are implemented by software, as shown in FIG. 9, the polar code retransmission apparatus 800 includes: a memory 901, configured to store a program; and a processor 902, configured to execute the program stored in the memory 901. When the program is executed, the polar code retransmission apparatus 800 is enabled to implement the polar code retransmission method provided in the foregoing embodiments.

Figure 10:
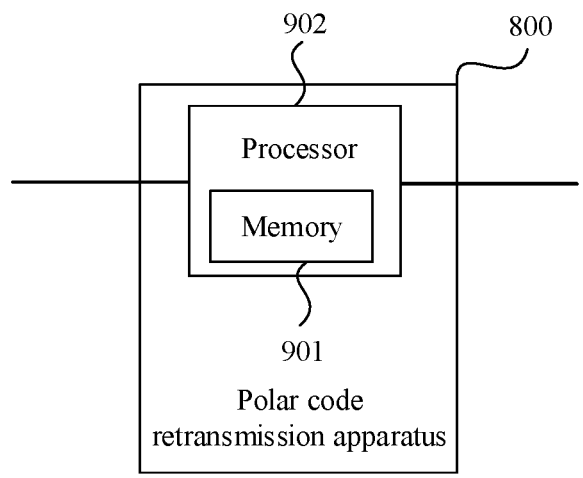
FIG. 10 is a fourth schematic diagram of a structure of a polar code retransmission apparatus according to an embodiment of this application.

Optionally, the memory 901 may be a physically independent unit. Alternatively, as shown in FIG. 10, the memory 901 is integrated with the processor 902.

Optionally, when some or all steps of the method in the foregoing embodiments are implemented by software, the polar code retransmission apparatus 800 may alternatively include only a processor 902. A memory 901 configured to store a program is located outside the polar code retransmission apparatus 1800. The processor 902 is connected to the memory 901 by using a circuit/wire, and is configured to read and execute the program stored in the memory 901.

An embodiment of this application provides a computer storage medium, configured to store a computer program. The computer program includes instructions for performing the polar code retransmission method.

An embodiment of this application provides a computer program product including instructions. When the computer program product runs on a computer, the computer is enabled to perform the polar code retransmission methods.

A person skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to the embodiments of this application. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions may alternatively be loaded onto the computer or the another programmable data processing device, so that a series of operations and steps are performed on the computer or the another programmable device, to generate computer-implemented processing. Therefore, the instructions executed on the computer or the another programmable device provide steps for implementing a specific function in one or more procedures in the flowcharts and/or in one or more blocks in the block diagrams.

Although some embodiments of this application have been described, persons skilled in the art can make changes and modifications to these embodiments once they learn the basic inventive concept. Therefore, the following claims are intended to be construed as to cover the embodiments and all changes and modifications falling within the scope of this application.

Persons skilled in the art can make various modifications and variations to the embodiments of this application without departing from the scope of the embodiments of this application. In this way, this application is also intended to cover these modifications and variations of the embodiments of this application provided that they fall within the scope of protection defined by the following claims and their equivalent technologies.

What is claimed is:

1. A polar code retransmission method, comprising:
    performing, by an encoding device, polar code encoding on K first to-be-encoded bits based on a first construction parameter to obtain a first code word, wherein the first construction parameter comprises a first information bit position set, elements in the first information bit position set are used to indicate positions of the K first to-be-encoded bits, and K is a positive integer;
    sending, by the encoding device, the first code word to a decoding device;
    receiving, by the encoding device, from the decoding device, information used to indicate that decoding of the first code word fails;
    performing, by the encoding device, polar code encoding on the K first to-be-encoded bits and K' second to-be-encoded bits based on a second construction parameter to obtain a second code word, wherein K' is a positive integer, the second construction parameter comprises a second information bit position set, elements in the second information bit position set are used to indicate positions of the K first to-be-encoded bits and positions of the K' second to-be-encoded bits, an element that is in the second information bit position set and that is used to indicate a position of a first to-be-encoded bit is a sum of N and an element that is in the first information bit position set and that is used to indicate the position of the first to-be-encoded bit, N is a length of a mother code obtained through encoding during initial transmission, and N is an integer power of 2; and sending, by the encoding device, a subcode in the second code word other than the first code word to the decoding device.

2. The method according to claim 1, wherein the K first to-be-encoded bits comprise a first information bit and a first check bit, and the first check bit is used to check the first information bit.

3. The method according to claim 1, wherein the K' second to-be-encoded bits comprise a second information bit; or the K' second to-be-encoded bits comprise the second information bit and a second check bit, and the second check bit is used to check the first information bit and/or the second information bit.

4. The method according to claim 1, wherein the K' second to-be-encoded bits are different from the K first to-be-encoded bits.

5. The method according to claim 1, wherein the K' second to-be-encoded bits comprise a part of bits in the K first to-be-encoded bits, and the part of bits are located at the first one or more of positions in the first information bit position set that are arranged in ascending order of reliability.

6. The method according to claim 1, wherein the first code word is a subcode of the second code word.

7. The method according to claim 1, wherein the encoding device is a network device or a terminal or a chip.

8. A polar code retransmission apparatus, comprising:
at least one non-transitory memory, configured to store instructions;
at least one processor, which upon execution of the instructions, is enabled to:
perform polar code encoding on K first to-be-encoded bits based on a first construction parameter to obtain a first code word, wherein the first construction parameter comprises a first information bit position set, elements in the first information bit position set are used to indicate positions of the K first to-be-encoded bits, and K is a positive integer;
send the first code word to a decoding device;
receive, from the decoding device, information used to indicate that decoding of the first code word fails;
perform polar code encoding on the K first to-be-encoded bits and K' second to-be-encoded bits based on a second construction parameter to obtain a second code word, wherein K' is a positive integer, the second construction parameter comprises a second information bit position set, elements in the second information bit position set are used to indicate positions of the K first to-be-encoded bits and positions of the K' second to-be-encoded bits, an element that is in the second information bit position set and that is used to indicate a position of a first to-be-encoded bit is a sum of N and an element that is in the first information bit position set and that is used to indicate the position of the first to-be-encoded bit, N is a length of a mother code obtained through encoding during initial transmission, and N is an integer power of 2; and
send a subcode in the second code word other than the first code word to the decoding device.

9. The apparatus according to claim 8, wherein the K first to-be-encoded bits comprise a first information bit and a first check bit, and the first check bit is used to check the first information bit.

10. The apparatus according to claim 8, wherein the K' second to-be-encoded bits comprise a second information bit; or the K' second to-be-encoded bits comprise the second information bit and a second check bit, and the second check bit is used to check the first information bit and/or the second information bit.

11. The apparatus according to claim 8, wherein the K' second to-be-encoded bits are different from the K first to-be-encoded bits.

12. The apparatus according to claim 8, wherein the K' second to-be-encoded bits comprise a part of bits in the K first to-be-encoded bits, and the part of bits are located at the first one or more of positions in the first information bit position set that are arranged in ascending order of reliability.

13. The apparatus according to claim 8, wherein the first code word is a subcode of the second code word.

14. The apparatus according to claim 8, wherein the apparatus is a network device or a terminal or a chip.

15. A non-transitory computer-readable storage medium, wherein the computer-readable storage medium stores computer-readable instructions, wherein when the computer-readable instructions are run on a computer, the computer is enabled to:
perform polar code encoding on K first to-be-encoded bits based on a first construction parameter to obtain a first code word, wherein the first construction parameter comprises a first information bit position set, elements in the first information bit position set are used to indicate positions of the K first to-be-encoded bits, and K is a positive integer;
send the first code word to a decoding device;
receive, from the decoding device, information used to indicate that decoding of the first code word fails;
perform polar code encoding on the K first to-be-encoded bits and K' second to-be-encoded bits based on a second construction parameter to obtain a second code word, wherein K' is a positive integer, the second construction parameter comprises a second information bit position set, elements in the second information bit position set are used to indicate positions of the K first to-be-encoded bits and positions of the K' second to-be-encoded bits, an element that is in the second information bit position set and that is used to indicate a position of a first to-be-encoded bit is a sum of N and an element that is in the first information bit position set and that is used to indicate the position of the first to-be-encoded bit, N is a length of a mother code obtained through encoding during initial transmission, and N is an integer power of 2; and
send a subcode in the second code word other than the first code word to the decoding device.

16. The computer-readable storage medium according to claim 15, wherein the K first to-be-encoded bits comprise a first information bit and a first check bit, and the first check bit is used to check the first information bit.

17. The computer-readable storage medium according to claim 15, wherein the K' second to-be-encoded bits comprise a second information bit; or the K' second to-be-encoded bits comprise the second information bit and a second check bit, and the second check bit is used to check the first information bit and/or the second information bit.

18. The computer-readable storage medium according to claim 15, wherein the K' second to-be-encoded bits are different from the K first to-be-encoded bits.

19. The computer-readable storage medium according to claim 15, wherein the K' second to-be-encoded bits comprise a part of bits in the K first to-be-encoded bits, and the part of bits are located at the first one or more of positions in the first information bit position set that are arranged in ascending order of reliability.

20. The computer-readable storage medium according to claim 15, wherein the first code word is a subcode of the second code word.

* * * * *